Nov. 4, 1930.    C. DUBOIS    1,780,817
MOTOR DRIVEN SHEARS
Filed Feb. 6, 1930
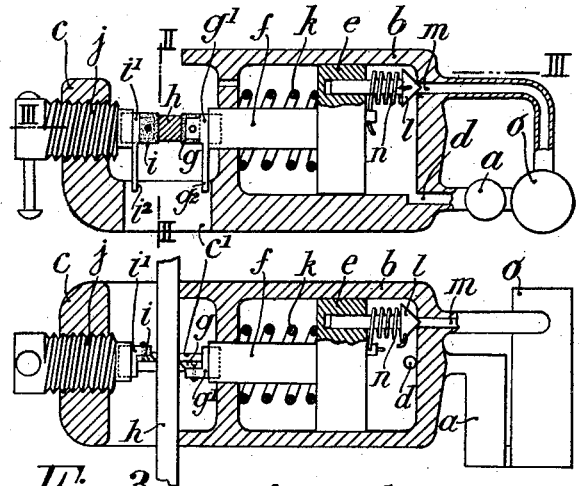
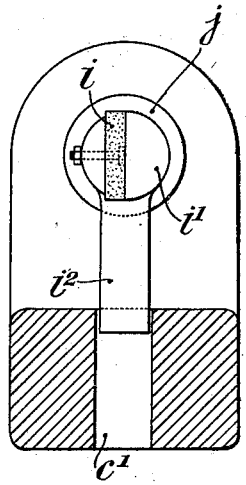
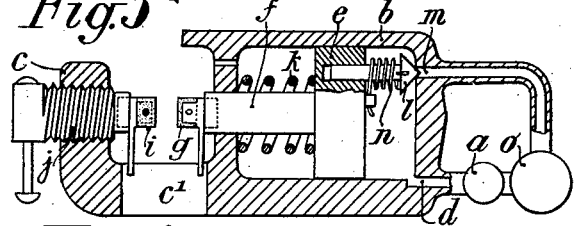
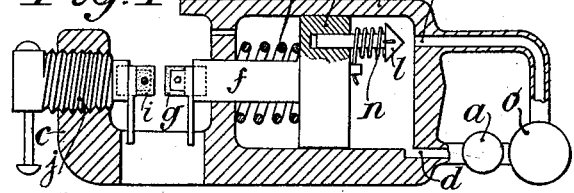
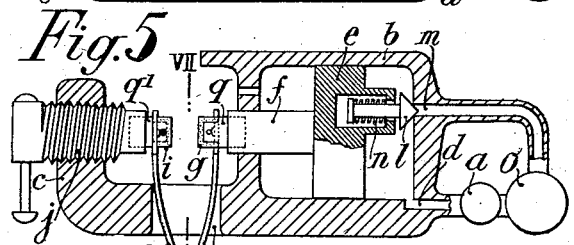
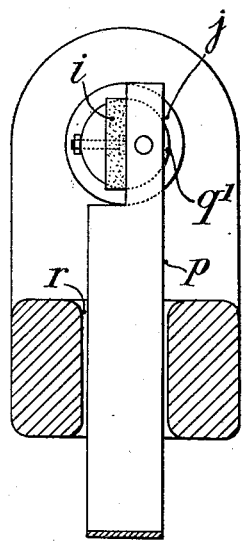
C. Dubois
INVENTOR
By Marks & Clerk
ATTYS.

Patented Nov. 4, 1930

1,780,817

UNITED STATES PATENT OFFICE

CHARLES DUBOIS, OF PARIS, FRANCE, ASSIGNOR TO SOCIÉTÉ INDUSTRIELLE DE MATÉRIEL D'ENTREPRISE ET DE CONSTRUCTION, OF PARIS, FRANCE

MOTOR-DRIVEN SHEARS

Application filed February 6, 1930, Serial No. 426,425, and in France February 28, 1929.

The present invention relates to shears capable of cutting metal bars of any cross section and adapted to be actuated by a motor.

Shears of this type are already known, which are provided with a clutch; the operator is then compelled to present to the cutters the bar to be sheared, then to actuate the clutch; there are therefore two distinct operations, resulting in a substantial loss of time. In other shears, the cutters continuously close and open at a regular rhythm depending on the speed of the motor. The operator must observe this rhythm and wait for an opening period of the cutters for presenting the bar to be sheared; the time passed in waiting for this opening period may not be considerable, but it causes a substantial loss of time when it occurs a great number of times.

The present invention has for an object to avoid these inconveniences by providing shears in which the cutting of the bar automatically begins as soon as the latter is presented between the cutters, without the operator being compelled to actuate any control member.

For that purpose, the shears in accordance with the invention have two cutters, one of which is acutated by a piston engine, and a valve gear associated with the piston in such a manner that the driving action of the fluid lasts only as long as a resistance is opposed to the advance of the piston, this having for result that the latter has a reciprocating movement of very small amplitude as long as the movable cutter is running idly.

The adjustment is such that the interval between the fixed cutter and the cutter thus receiving a pulsatory movement is then alternatively a little greater and a little smaller than the thickness of the bar to be sheared. The latter can then be easily and instantaneously inserted between the cutters.

The pulsations cease as soon as the bar constitutes an obstacle to the rapid displacement of the movable cutter, and the driving fluid acting from this moment with all its power on the piston produces the required shearing action.

In order that the invention may be more clearly understood, two forms of construction of the shears will now be described, by way of example, in the accompanying drawing in which:

Fig. 1 is an axial longitudinal section of a first form of the shears at the time a bar is inserted in position.

Fig. 2 is a cross section made according to line II—II of Fig. 1.

Fig. 3 is a horizontal section made according to line III—III of Fig. 1.

Fig. 4 is a section similar to that of Fig. 1, without any bar being placed between the cutters.

Fig. 5 is a section similar to that of Fig. 4, the parts occupying a different position.

Fig. 6 shows a second form of carrying out the invention.

Fig. 7 is a cross section made according to line VII—VII of Fig. 6.

The shears illustrated in Figs. 1 to 5 essentially comprise a pneumatic or hydraulic press cylinder $b$ having an inlet orifice $d$ and an exhaust orifice $m$, a piston $e$ on which a fluid under pressure acts in opposition to a spring $k$, and the rod $f$ which carries at its end the movable cutter $g$. The fixed cutter $i$ is carried by a screw $j$ passing through an abutment $c$ integral with the cylinder. Each cutter is secured on a member $g^1$ or $i^1$, provided with a vertical finger $g^2$ or $i^2$ which slides in a groove $c^1$ of the frame and which prevents it from rotating, although this member $g^1$ or $i^1$ is mounted in a cylindrical recess or housing of the piston rod $f$ or of the screw $j$, respectively.

A valve $l$ mounted in the piston $e$, opposite the exhaust orifice $m$, is connected to the piston by a tension spring $n$. The orifice $m$ communicates with a tank $o$ in which the pump $a$ sucks the fluid under pressure for compressing it again.

The operation is as follows:

The pump $a$ constantly and regularly sends the fluid under pressure, through the orifice $d$, into the cylinder $b$, and this fluid pushes the piston $e$ in opposition to the action of the spring $k$. The pressure exerted by the pump and the strength of the springs $k$ and $n$ are so controlled that, if no bar is inserted between the cutter $i$ and $g$, the thrust of the fluid upon the valve $l$ is, first, at the beginning of the forward movement of the piston $e$ greater than the pulling force of the spring $n$, so that this valve remains closed, the tension of the spring $n$ increasing, the valve is moved away from the orifice $m$, allowing the fluid under pressure to escape and permitting the spring $k$ to bring back to its starting position the piston and the valve $l$ which again closes the exhaust orifice $m$. The cycle is then finished and the reciprocating movement of the piston takes place over again. The pressure of the fluid and the forces of both springs $k$ and $n$ are moreover adjusted in such a manner that the reciprocating movement of the piston is very limited, of the order of two and a half millimeters to three millimeters, and sufficiently rapid in order that the piston may be considered as receiving a series of pulsations.

The position of the cutter $i$ relatively to that of the cutter $g$ is adjusted by means of the screw $j$, so that their maximum interval be two millimeters greater than the thickness of the bar to be sheared. Owing to this adjustment of the interval of the cutter and to that of the speed of the pulsations, the bar which is presented between the cutters can be nearly instantaneously and very easily inserted.

The piston $e$ is then prevented by the bar to be sheared $h$ from advancing as rapidly as previously, and the pressure in the press cylinder $b$ increases with sufficient rapidity in order that the pull of the spring $n$, when it begins to act, be insufficient for overcoming the pressure of the compressing fluid on the valve $l$, so that the latter remains closed during the remainder of the piston stroke, that is to say until the bar $h$ is completely sheared. On the contrary, as soon as the bar is sheared, the pressure of the fluid in the press cylinder suddenly diminishes and no longer balances the pull of the spring $n$ which becomes sufficiently strong for pulling the valve $l$ away from its seat, this causing the escape of the compressing fluid through the orifice $m$, the return of the piston to its initial position and the recommencement of its pulsatory movement until a new bar is inserted between the cutters.

According to the form of construction of the shears illustrated in Fig. 6, the spring $n$ is mounted in such a manner that it acts on the valve $l$ by compression, and the helical spring $k$ is replaced by a V-shaped spring $p$ tending to open and to space apart the ends of the screw $j$ and of the rod $f$, by pressing on these latter through the medium of members $q$, $q^1$ which carry the cutters $g$ and $i$ and are arranged in circular recesses provided in the ends of the screw $j$ and of the rod $f$; the spring $p$ is fitted with slight friction in a mortice $r$ provided in the frame and its branches prevent the members $q$, $q^1$ from rotating relatively to each other, thus ensuring the parallelism of the cutters notwithstanding the eventual rotations of the screw $j$ relatively to the rod $f$.

The operation is obviously the same as in the preceding case.

In the form of construction described, the tension of the spring $n$ directly varies with the distance between the piston and the valve; but it will be easily understood that it would be possible, if need be, to add between the valve and the piston, any mechanical device capable of modifying the tension of the spring $n$ acting for closing the valve according to any desired law in function of the displacement of the piston. Any adjusting devices can also be provided for modifying the initial tension of the spring $n$.

Claims:

1. Shears actuated by a driving fluid under pressure and adapted to shear members of a definite width, comprising a cylinder having an inlet orifice and an exhaust orifice, a piston in this cylinder, a fixed cutter, a movable cutter actuated by the said piston, a valve on the exhaust orifice and opening inwardly of the cylinder, a spring adapted to close the said valve, the said spring being connected to the piston so as to be progressively stretched in proportion as the piston advances in the direction corresponding to the closing of the shears, a spring adapted to move the piston in the reverse direction, and means for continuously delivering the driving fluid into the cylinder through the said inlet orifice.

2. Shears actuated by a driving fluid under pressure and adapted to shear members of a definite width, comprising a cylinder having an inlet orifice and an exhaust orifice, a piston in this cylinder, a fixed cutter, a movable cutter actuated by the said piston, a valve on the exhaust orifice and opening inwardly of the cylinder, a spring adapted to close the said valve, the said spring being connected to the piston so as to be progressively stretched in proportion as the piston advances in the direction corresponding to the closing of the shears, means for moving the piston in the reverse direction, and means for continuously delivering the driving fluid into the cylinder through the said inlet orifice, the said spring being such that the thrust of the valve on the exhaust orifice under the pressure of the driving fluid, when the shears operate idly, be overcome by the tension of the said spring as soon as the piston has moved forward a few millimeters only.

3. Shears actuated by a driving fluid under pressure and adapted to shear members of a definite width, comprising a cylinder having an inlet orifice and an exhaust orifice, a piston in this cylinder, a fixed cutter, a movable cutter actuated by the said piston, a valve on the exhaust orifice and opening inwardly of the cylinder, a spring adapted to close the said valve, the said spring being connected to the piston so as to be progressively stretched in proportion as the piston moves in the direction corresponding to the closing of the shears, means for moving the piston in the reverse direction, and means for continuously delivering the driving fluid into the cylinder through the said inlet orifice, the said spring being such that the thrust of the valve on the exhaust orifice under the pressure of the driving fluid, when the shears operate idly, be overcome by the tension of the said spring when the distance between the cutters is less than the width of the parts or members to be cut.

4. Shears actuated by a driving fluid, comprising a cylinder having an inlet orifice and an exhaust orifice, a piston in this cylinder, a fixed cutter the position of which is adjustable, a movable cutter rigidly connected to the piston, a valve on the exhaust orifice and opening inwardly of the cylinder, a spring adapted to close the said valve, one end of this spring being attached to the said valve, and the other end being attached to the said piston, means for moving the piston in the direction corresponding to the opening of the shears, and means for continuously delivering the driving fluid into the cylinder.

In testimony whereof I have hereunto affixed my signature.

CHARLES DUBOIS.